(12) United States Patent
Sanders

(10) Patent No.: US 9,113,299 B2
(45) Date of Patent: Aug. 18, 2015

(54) METHOD AND APPARATUS FOR AUTOMATIC MOBILE ENDPOINT DEVICE CONFIGURATION MANAGEMENT BASED ON USER STATUS OR ACTIVITY

(71) Applicant: Xerox Corporation, Norwalk, CT (US)

(72) Inventor: Aaron Dale Sanders, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 139 days.

(21) Appl. No.: 13/897,259

(22) Filed: May 17, 2013

(65) Prior Publication Data

US 2014/0342714 A1    Nov. 20, 2014

(51) Int. Cl.
*H04W 24/00*    (2009.01)
*H04W 4/02*    (2009.01)
*H04W 52/02*    (2009.01)
*H04W 12/08*    (2009.01)

(52) U.S. Cl.
CPC .............. *H04W 4/021* (2013.01); *H04W 12/08* (2013.01); *H04W 52/0209* (2013.01)

(58) Field of Classification Search
CPC ...................................................... H04W 4/021
USPC ................ 455/412.2, 414.2, 418, 420–422.1, 455/550.1, 556.2, 41.1, 41.2; 370/328, 338
See application file for complete search history.

(56) References Cited

U.S. PATENT DOCUMENTS

| | | | |
|---|---|---|---|
| 6,615,170 B1 * | 9/2003 | Liu et al. | 704/233 |
| 8,254,902 B2 | 8/2012 | Bell et al. | |
| 2002/0077830 A1 * | 6/2002 | Suomela et al. | 704/275 |
| 2008/0077865 A1 * | 3/2008 | Hiles et al. | 715/708 |
| 2009/0259691 A1 * | 10/2009 | Tanskanen et al. | 707/200 |
| 2011/0169647 A1 * | 7/2011 | Morley | 340/573.4 |

FOREIGN PATENT DOCUMENTS

| | | |
|---|---|---|
| EP | 1162853 A1 | 12/2001 |
| WO | WO 2010/138164 A1 | 12/2010 |

* cited by examiner

*Primary Examiner* — Babar Sarwar

(57) ABSTRACT

A method, non-transitory computer readable medium, and apparatus for automatically configuring a mobile endpoint device are disclosed. For example, the method stores one or more pre-defined configuration settings for the mobile endpoint device, receives a location of the mobile endpoint device, identifies a location characteristic of the location of the mobile endpoint device and configures the mobile endpoint device with one of the one or more pre-defined configuration settings based upon the location and the location characteristic of the mobile endpoint device.

14 Claims, 3 Drawing Sheets

METHOD AND APPARATUS FOR AUTOMATIC MOBILE ENDPOINT DEVICE CONFIGURATION MANAGEMENT BASED ON USER STATUS OR ACTIVITY

The present disclosure relates generally to managing a configuration of a mobile endpoint device and, more particularly, to a method and an apparatus for automatic mobile endpoint device configuration management based on user status or activity.

BACKGROUND

Many users currently manually change a configuration of their mobile endpoint device when they move from one environment to another environment or if they change from one activity to another activity. Throughout a course of a day, users may find it burdensome to continually change the configuration of their mobile endpoint device manually.

SUMMARY

According to aspects illustrated herein, there are provided a method, a non-transitory computer readable medium, and an apparatus for configuring a mobile endpoint device. One disclosed feature of the embodiments is a method that stores one or more pre-defined configuration settings for the mobile endpoint device, receives a location of the mobile endpoint device, identifies a location characteristic of the location of the mobile endpoint device and configures the mobile endpoint device with one of the one or more pre-defined configuration settings based upon the location and the location characteristic of the mobile endpoint device.

Another disclosed feature of the embodiments is a non-transitory computer-readable medium having stored thereon a plurality of instructions, the plurality of instructions including instructions which, when executed by a processor, cause the processor to perform a method that stores one or more pre-defined configuration settings for the mobile endpoint device, receives a location of the mobile endpoint device, identifies a location characteristic of the location of the mobile endpoint device and configures the mobile endpoint device with one of the one or more pre-defined configuration settings based upon the location and the location characteristic of the mobile endpoint device.

Another disclosed feature of the embodiments is an apparatus comprising a processor and a computer readable medium storing a plurality of instructions which, when executed by the processor, cause the processor to perform operations that store one or more pre-defined configuration settings for the mobile endpoint device, receive a location of the mobile endpoint device, identify a location characteristic of the location of the mobile endpoint device and configure the mobile endpoint device with one of the one or more pre-defined configuration settings based upon the location and the location characteristic of the mobile endpoint device.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer readable medium for automatically configuring a mobile endpoint device. As discussed above, many users currently manually change a configuration of their mobile endpoint device when they move from one environment to another environment or if they change from one activity to another activity. Throughout a course of a day, a users may find it burdensome to continually change the configuration of their mobile endpoint device manually.

One embodiment of the present disclosure provides a method for automatically configuring a mobile endpoint device. For example, the method provides the ability to automatically configure any number of parameters of the mobile endpoint device, including for example, notifications, application configurations, security setting, background processes, data connections, and the like.

In addition, the mobile endpoint device may be automatically configured in response to a status of a user of the mobile endpoint device. In one embodiment, the status may be based upon calendar information on the mobile endpoint device, a rate of movement, an availability of a particular network connection, a location and/or a location characteristic.

In one embodiment, the mobile endpoint device may automatically configure any one of the number of parameters in response to any one or more of the statuses of the user. In one embodiment, this may be performed by using pre-defined configuration settings that are defined by the user for a particular status. Thus, as the user's status changes, the mobile endpoint device may automatically be configured in accordance with a pre-defined configuration setting for that particular status. In one embodiment, if no matching configuration setting can be found, a default configuration setting may be used.

Figure 1:
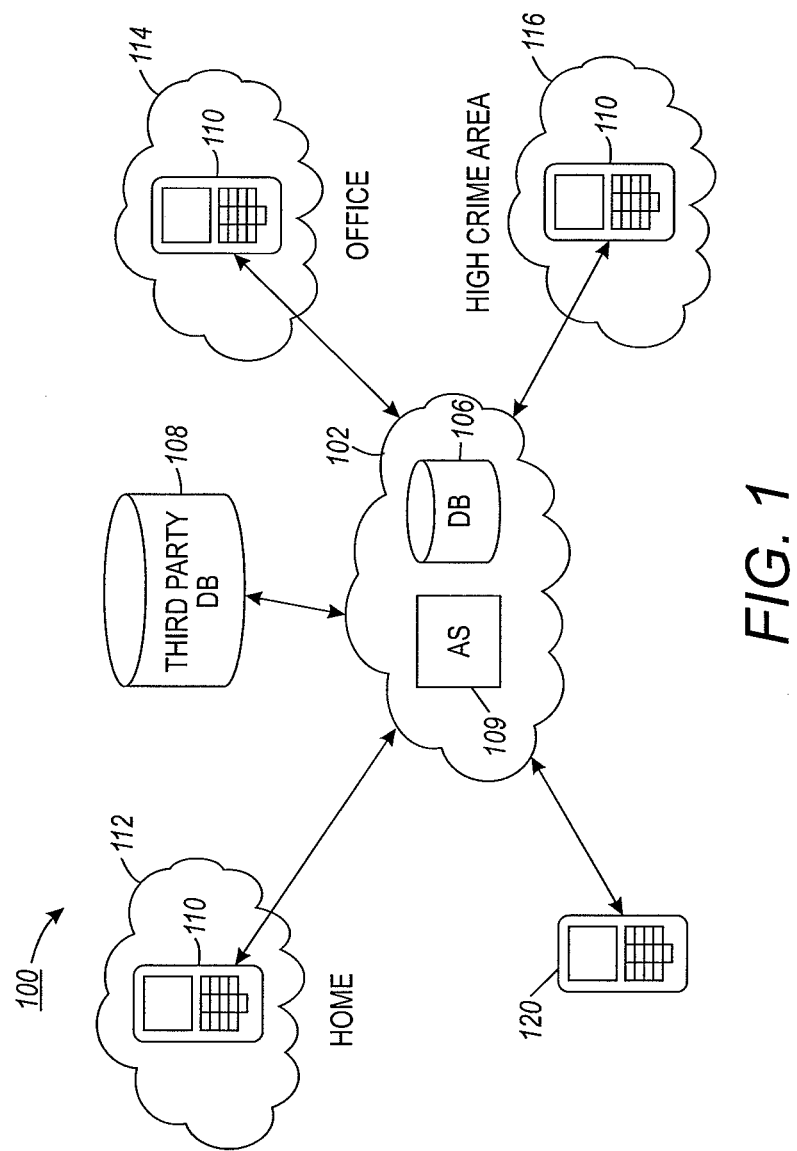
FIG. 1 illustrates one example of a communication network of the present disclosure.

To better understand the present disclosure, FIG. 1 illustrates an example of a communication network 100. In one embodiment, the communication network 100 may include a packet network such as an Internet Protocol (IP) network 102. The IP network 102 may be, for example, a cellular communication network, the Internet, a service provider network, an access network, a core network, and the like.

In one embodiment, the IP network 102 may include an application server (AS) 109 and a database (DB) 106. Although the AS 109 and DB 106 are illustrated as being in the IP network 102, it should be noted that the AS 109 and the DB 106 may also be located remotely from the IP network 102, but still be in communication with the IP network 102. It should be noted that although only a single AS 109 and a single DB 106 are illustrated, that any number of application servers or databases may be deployed.

The AS 109 may include a processor and a memory for storing information. In one embodiment, the AS 109 may be embodied as a general purpose computer as illustrated in FIG. 4 and discussed below.

In one embodiment, the DB 106 may store various information such as, for example, user registration information (e.g., a type of device that is being used, a data plan associated with the device, etc.), personal information of the user (e.g., telephone number, address, date of birth, etc), location characteristic information, pre-defined configuration settings for the user's mobile endpoint device, and the like.

In one embodiment, a third party DB 108 may be in communication with the IP network 102. In one embodiment, the third party DB 108 may be remotely located from the AS 109 and DB 106 and owned and operated by a third party that is different from the service provider of the IP network 102. Although only a single third party DB 108 is illustrated in FIG. 1, it should be noted that any number of third party databases may be deployed.

In one embodiment, the third party DB 108 may store location characteristic information that may be used to determine if a particular area is a high crime rate area. For example, the third party DB 108 may store crime rates for various cities or locations. The third party DB 108 may be a database of crime rates located in a local police station or an independent agency.

In one embodiment, the communication network 100 may include mobile endpoint devices 110 and 120. Although only two mobile endpoint devices 110 and 120 are illustrated in FIG. 1, it should be noted that any number of mobile endpoint devices may be deployed.

In one embodiment, the mobile endpoint devices 110 and 120 may be any type of mobile endpoint device capable of communicating with the IP network 102. For example, the mobile endpoint devices 110 and 120 may be a mobile telephone, a cellular telephone, a smartphone, a laptop computer with calling capability, an ultrabook with calling capability, a tablet computer with calling capability, and the like.

FIG. 1 illustrates the mobile endpoint device 110 moving around to various different locations 112, 114 and 116. In one embodiment, locations include a home location 112, an office location 114 and a high crime location 116. In one embodiment, the mobile endpoint device 110 may communicate with the IP network 102 from the various different locations 112, 114 and 116 using different data connections. For example, the mobile endpoint device 110 may communicate with the IP network 102 using a Wi-Fi network at the home location 112 and using a 4G long term evolution (LTE) connection at the office location 114 and the high crime location 116. In one embodiment, the mobile endpoint device 110 may communicate with the IP network 102 to try and connect a call to the mobile endpoint device 120, to connect to the Internet, and the like.

It should be noted that the communication network 100 has been simplified. For example, the network 100 may include other network elements (not shown) such as border elements, routers, switches, policy servers, security devices, firewalls, a content distribution network (CDN), and the like. In addition, the communication network 100 may include additional networks between the IP network 102, the mobile endpoint devices 110 and 120, such as different access networks (not shown).

In one embodiment, the mobile endpoint device 110 may store the pre-defined configuration settings and perform a method for automatically configuring the mobile endpoint device. In another embodiment, the mobile endpoint device 110 may be a hardware device that operates an application or software program that is in communication with the AS 109 in the IP network 102. As a result, the AS 109 may perform the method for automatically configuring the mobile endpoint device and the pre-defined configuration settings may be stored in the DB 106 in the IP network 102.

As noted above, in one embodiment the user of the mobile endpoint device may pre-define one or more pre-defined configuration settings for the mobile endpoint device for each one of a plurality of different locations 112, 114 and 116. For example, the pre-defined configuration settings may include a home location configuration setting for the home location 112, an office location configuration setting for the office location 114 and a high crime location configuration setting for the high crime location 116. The user may similarly pre-define one or more pre-defined configuration settings for other types of statuses noted above such as calendar information, rate of movement, type of data connection, whether the network is a trusted network or an untrusted network, and the like.

In one embodiment, the pre-defined configuration settings may allow the user to pre-define any parameter that may be configurable for the mobile endpoint device 110 or 120 or any software or application running on the mobile endpoint device 110 or 120. For example, the pre-defined configuration settings may include a change to any one of a security setting (e.g., encryption, password protection (strong or weak), automatic lock timer, etc.), an application setting (e.g., in-app purchases, push notifications, automatic updates, automatic web browser refreshes, etc.), a background processing setting (e.g., searching for software updates, turning off idle applications, using location services or find me services, searching for Wi-Fi connections, roaming connections, etc.), a power setting (e.g., a sleep timer, a display shut down timer, a display brightness, etc.), a notification setting (e.g., vibration, volume, ring tone, text messages, emails or text messages from a particular individual, etc.), a data connection setting (e.g., a Wi-Fi connection, a cellular connection (e.g., 3G or 4G), etc.), and the like.

For example, when the user is at the home location 112, the user may know that he or she has a Wi-Fi connection at home. In addition, the user may not want his or her children to make in-app purchases for applications on his or her mobile endpoint device 110 if his or her children play with the mobile endpoint device 110. Furthermore, the user may know that the Wi-Fi connection at home is a trusted network and is relatively safe.

As a result, the user may set one or more parameters of the mobile endpoint device 110 in the pre-defined configuration setting for the home location 112. For example, the pre-defined configuration setting may include automatically setting the data connection to Wi-Fi, locking all applications from making in-app purchases (e.g., turning on a password lock for any purchases attempted in the application) and setting the mobile endpoint device to a minimal security setting (e.g., no encryption, no firewall or filter, no blocked websites for a web browser, a shorter automatic lock timer, and the like).

However, as the user moves with the mobile endpoint device 110 to a different location, for example, the office location 114, the user may wish to have different configuration settings for the mobile endpoint device 110. For example, the user may transmit sensitive documents from the office location 114 and not have access to a Wi-Fi network. In addition, the user may not have access to a charger and would like to maximize battery efficiency. Also, the user may not want to allow anyone to access his or mobile endpoint device 110 if he or she leaves the mobile endpoint device 110 on his or her desk or office.

As a result, the user may set one or more parameters of the mobile endpoint device 110 in the pre-defined configuration setting for the office location 114. For example, the pre-defined configuration setting may include setting the data connection to using a 4G LTE connection, setting the mobile endpoint device to increase a security level by adding password protection to access the mobile endpoint device 110 and encrypting data sent to and from the mobile endpoint device 110 and turning off any background processes run by applications on the mobile endpoint device 110 to reduce battery consumption.

In another embodiment, the user may move with the mobile endpoint device 110 to a high crime location 116. For example, the high crime location 116 may have a high likelihood of having the mobile endpoint device 110 stolen or a potential need to quickly contact law enforcement. In addition, there may be no Wi-Fi access in the high crime location 116.

As a result, the user may set one or more parameters of the mobile endpoint device 110 in the pre-defined configuration setting for the high crime location 116. For example, the pre-defined configuration setting may include setting the data connection to using a 4G LTE connection, setting the mobile endpoint device to increase a security level by adding a strong password protection (e.g., requiring numbers, letters, a capital letter and a special character) to access the mobile endpoint device 110, encrypting data sent to and from the mobile endpoint device 110, turning on location services to allow third parties to track the user while in the high crime location 116, enable 1-touch emergency dialing (e.g., holding the single button for "1" to automatically dial 9-1-1, broadly referred to as speed dialing), having a short automatic lock timer, and the like.

In one embodiment, the location may be determined by using global positioning system (GPS) data or GPS location coordinates. However, many times the GPS coordinates by themselves do not provide any location characteristic information. For example, simply by looking at a longitude and a latitude coordinate one would not know that it is a home location of a user or an office location. In one embodiment, location characteristic information may be pre-defined by the user. For example, when located at the user's home, the user may associate the GPS coordinates with the location characteristic of home. Thus, when the mobile endpoint device 110 detects the same location, the mobile endpoint device 110 may know that the location is the home location 112 of the user.

In another embodiment, the location characteristic may be automatically determined using information obtained from a third party database, e.g., the third party DB 108. For example, the third party DB 108 may track crime rates or crime information for a particular city or a particular part of a city.

In one embodiment, a "high crime location" may be defined as a location having a crime rate above a threshold. The threshold may be based upon a number of crimes or a particular type of crime per a number of people. The threshold may be defined by the user or the service provider of the communication network 100. For example, the user or the service provider may set a threshold of all crimes above 3,000 per 100,000 people. In another example, the threshold may be set to violent crimes above 1000 per 100,000 people. In yet another example, the threshold may be set to property crimes above 5,000 per 100,000 people. The thresholds provided above are only examples and should not be considered to be limiting.

In one embodiment, the AS 109 may obtain crime rate data from one or more different third party DBs 108 and determine which locations are high crime locations 116 before the mobile endpoint device 110 enters the high crime locations 116. The high crime locations 116 may be stored in the DB 106 within the IP network 102 such that when the mobile endpoint device 110 enters a high crime location 116, the AS 109 may simply look up GPS coordinates or city name in the DB 106 to determine whether the location is a high crime location 116. In another embodiment, the AS 109 may obtain crime rate data from the one or more different third party DBs 108 on demand when the mobile endpoint device 110 enters a particular location.

Thus, in one embodiment, the mobile endpoint device 110 may be automatically configured based upon a location and a location characteristic. In other words, the status is not only location, but also some additional information about the location that cannot be obtained by looking at the location itself (e.g., whether the location is a home, an office, a high crime area, and the like).

Although location is used as an example for the status, it should be noted that any status discussed above may be used to automatically configure the mobile endpoint device. For example, calendar information (e.g., a meeting location, a sporting event and sporting event location, and the like), a rate of movement (e.g., the user is driving in his or car based upon a rate of change of the mobile endpoint device's location), whether the network is a trusted network or an untrusted network, and the like.

Figure 2:
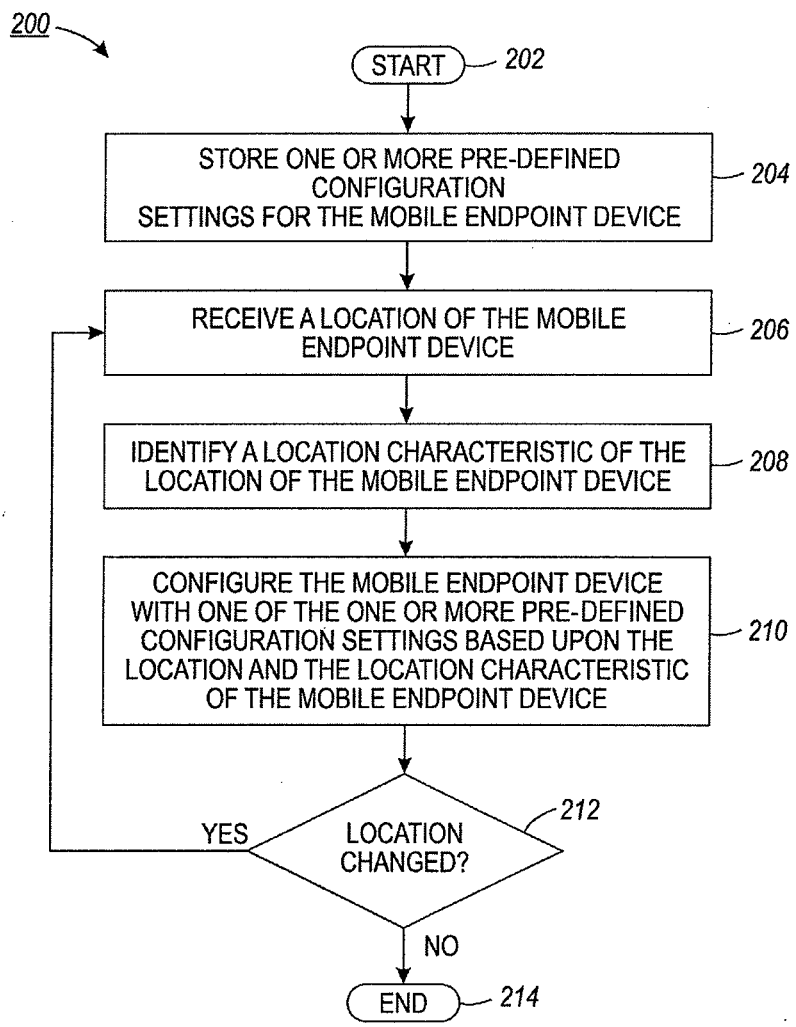
FIG. 2 illustrates an example flowchart of a method for automatically configuring a mobile endpoint device.
Figure 3:
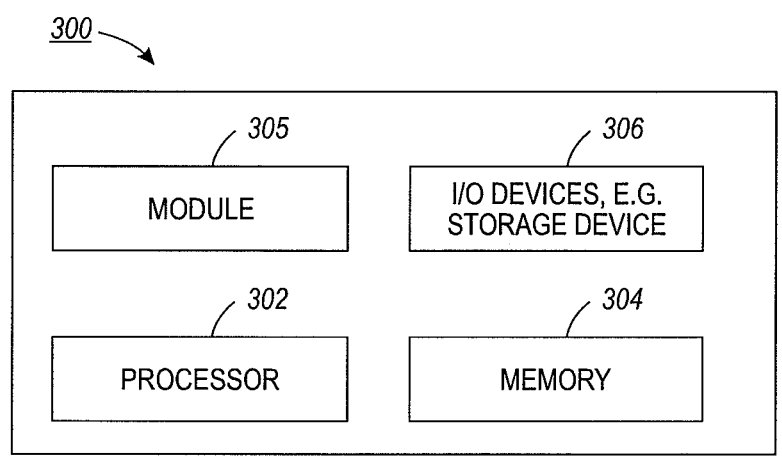
FIG. 3 illustrates a high-level block diagram of a general-purpose computer suitable for use in performing the functions described herein.

FIG. 2 illustrates a flowchart of a method 200 for automatically configuring a mobile endpoint device. In one embodiment, one or more steps or operations of the method 200 may be performed by the mobile endpoint device 110, the application server 109 and/or a general-purpose computer as illustrated in FIG. 3 and discussed below.

The method 200 begins at step 202. At step 204, the method 200 stores one or more pre-defined configuration settings for the mobile endpoint device. In one embodiment, there may be a plurality of pre-defined configuration settings for each one of a plurality of different statuses. In one embodiment, the statuses may be a plurality of different locations.

For example, a user may set a pre-defined configuration setting for the mobile endpoint device when it is located at a location associated with his or her home location, another pre-defined configuration setting for the mobile endpoint device when it is located at a location associated with his or her office location, yet another pre-defined configuration setting for the mobile endpoint device when it is located at a location associated with a high crime location, and the like.

At step 206, the method 200 receives a location of the mobile endpoint device. For example, in one embodiment, the location information may include a GPS coordinate.

At step 208, the method 200 identifies a location characteristic of the location of the mobile endpoint device. In one embodiment, the location characteristic may be pre-defined by a user. For example, the user may set a particular GPS coordinate as a home location, set another GPS coordinate as an office location, and so forth.

In one embodiment, the location characteristic may be based upon information obtained from a third party database. For example, the information may be related to a crime rate at the location. In one embodiment, the third party database may be from a local police station, from a centralized census database tracking crime rates for all cities, and the like.

In one embodiment, the location characteristic may be defined by the information from the third party database being above a threshold. For example, the location may be considered as a high crime location if the crime rate is above a threshold (e.g., 1,000 crimes per 100,000 people). In one embodiment, the threshold may be for a particular time period (e.g., 1,000 crimes per 100,000 people per year, 1,000 crimes per 100,000 for the last three months, and so forth).

At step 210, the method 200 configures the mobile endpoint device with one of the one or more pre-defined configuration settings based upon the location and the location characteristic of the mobile endpoint device. For example, the location may be looked up in a database to determine if the location is associated with a location characteristic. For example, the location may be the user's home location.

Subsequently, the mobile endpoint device or the AS may search to see if a pre-defined configuration setting exists for the home location. If a pre-defined configuration setting does exist, then the mobile endpoint device may be automatically configured in accordance with the pre-defined configuration setting for the home location. For example, the pre-defined configuration setting may include automatically setting the data connection to Wi-Fi, locking all applications from making in-app purchases (e.g., turning on a password lock for any purchases attempted in the application) and setting the mobile endpoint device to a minimal security setting (e.g., no encryption, no firewall or filter, no blocked websites for a web browser, and the like).

In one embodiment, if no pre-defined configuration setting for a particular location and location characteristic is found, then a default setting may be used. In another embodiment, if no pre-defined configuration setting for a particular location and location characteristic is found, a user may be prompted to create a pre-defined configuration setting for the location and location characteristic.

At step 212, the method 200 determines if the location has changed. If the location has changed, the method 200 returns to step 206 and repeats steps 206 to 212. However, if the location has not changed, the method 200 proceeds to step 214. At step 214, the method 200 ends.

It should be noted that although not explicitly specified, one or more steps, functions, or operations of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 2 that recite a determining operation, or involve a decision, do not necessarily require that both branches of the determining operation be practiced. In other words, one of the branches of the determining operation can be deemed as an optional step.

FIG. 3 depicts a high-level block diagram of a general-purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for automatically configuring a mobile endpoint device, and various input/output devices 306 (e.g., storage devices, including but not limited to, a tape drive, a floppy drive, a hard disk drive or a compact disk drive, a receiver, a transmitter, a speaker, a display, a speech synthesizer, an output device (such as a graphic display, printer, and the like), an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 305 for automatically configuring a mobile endpoint device can be loaded into memory 304 and executed by processor 302 to implement the functions as discussed above. As such, the present method 305 for automatically configuring a mobile endpoint device (including associated data structures) of the present disclosure can be stored on a non-transitory (e.g., physical and tangible) computer readable storage medium, e.g., RAM memory, magnetic or optical drive or diskette and the like. For example, the hardware processor 302 can be programmed or configured with instructions (e.g., computer readable instructions) to perform the steps, functions, or operations of method 200.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for configuring a mobile endpoint device, comprising:
   storing, by a processor, one or more pre-defined configuration settings for the mobile endpoint device;
   receiving, by the processor, a location of the mobile endpoint device;
   identifying, by the processor, a location characteristic of the location of the mobile endpoint device, wherein the location characteristic of the location is based upon information obtained from a third party database, wherein the information in the third party database comprises a high crime rate at the location, wherein the high crime rate is based upon a crime rate being above a threshold; and
   configuring, by the processor, the mobile endpoint device with one of the one or more pre-defined configuration settings based upon the location and the location characteristic of the mobile endpoint device, wherein each one of the one or more pre-defined configuration settings comprises a change to a security setting, an application setting, a background processing setting, a power setting, a notification setting and a data connection setting.

2. The method of claim 1, wherein each one of the one or more pre-defined configuration settings is associated with a different location and a different location characteristic.

3. The method of claim 1, wherein the location comprises a global positioning system (GPS) coordinate.

4. The method of claim 1, wherein the location characteristic of the location is predefined by a user of the mobile endpoint device.

5. A non-transitory computer-readable medium storing a plurality of instructions which, when executed by a processor, cause the processor to perform operations for configuring a mobile endpoint device, the operations comprising:
   storing one or more pre-defined configuration settings for the mobile endpoint device;
   receiving a location of the mobile endpoint device;
   identifying a location characteristic of the location of the mobile endpoint device, wherein the location characteristic of the location is based upon information obtained from a third party database, wherein the information in the third party database comprises a high crime rate at the location, wherein the high crime rate is based upon a crime rate being above a threshold; and
   configuring the mobile endpoint device with one of the one or more pre-defined configuration settings based upon the location and the location characteristic of the mobile endpoint device, wherein each one of the one or more pre-defined configuration settings comprises a change to a security setting, an application setting, a background processing setting, a power setting, a notification setting and a data connection setting.

6. The non-transitory computer-readable medium of claim 5, wherein each one of the one or more pre-defined configuration settings is associated with a different location and a different location characteristic.

7. The non-transitory computer-readable medium of claim 5, wherein the location comprises a global positioning system (GPS) coordinate.

8. The non-transitory computer-readable medium of claim 5, wherein the location characteristic of the location is pre-defined by a user of the mobile endpoint device.

9. The non-transitory computer-readable medium of claim 5, wherein the location characteristic of the location is based upon information obtained from a third party database.

10. The non-transitory computer-readable medium of claim 9, wherein the information in the third party database comprises a crime rate at the location.

11. The non-transitory computer-readable medium of claim 9, wherein the location characteristic of the location is based upon the information from the third party database being above a threshold.

12. A method for configuring a mobile endpoint device, comprising:

storing, by a processor, a plurality of pre-defined configuration settings for the mobile endpoint device, the plurality of pre-defined configuration settings including a home location configuration setting, a high crime location configuration setting and an office location configuration setting;

receiving, by the processor, a location of the mobile endpoint device;

identifying, by the processor, that the location of the mobile endpoint device is in a high crime location, a home location or an office location based upon the location of the mobile endpoint device, wherein the high crime location is based upon a crime rate being above a threshold, wherein the crime rate is obtained from a third party database; and configuring, by the processor, the mobile endpoint device with one of the plurality of pre-defined configuration settings based upon the location and whether the location is the high crime location, the home location or the office location, wherein each one of the one or more pre-defined configuration settings comprises a change to a security setting, an application setting, a background processing setting, a power setting, a notification setting and a data connection setting.

13. The method of claim 12, wherein the location comprises a global positioning system (GPS) coordinate.

14. The method of claim 12, wherein the home location and the office location are predefined by a user of the mobile endpoint device.

* * * * *